US010247849B2

United States Patent
Pfutzner et al.

(10) Patent No.: US 10,247,849 B2
(45) Date of Patent: Apr. 2, 2019

(54) METHOD FOR MEASURING FORMATION WATER SALINITY FROM WITHIN A BOREHOLE

(71) Applicants: Harold Pfutzner, Richmond, TX (US); James A. Grau, Marshfield, MA (US); Nancy J. Fruhman, Houston, TX (US); Raghu Ramamoorthy, Pune (IN); Shouxiang Ma, Dhahran (SA)

(72) Inventors: Harold Pfutzner, Richmond, TX (US); James A. Grau, Marshfield, MA (US); Ronald E. Plasek, Houston, TX (US); Raghu Ramamoorthy, Pune (IN); Shouxiang Ma, Dhahran (SA)

(73) Assignees: SCHLUMBERGER TECHNOLOGY CORPORATION, Sugar Lang, TX (US); SAUDI ARABIAN OIL COMPANY, Dhahran (SA)

(*) Notice: Subject to any disclaimer, the term of this patent is extended or adjusted under 35 U.S.C. 154(b) by 951 days.

(21) Appl. No.: 14/344,828

(22) PCT Filed: Sep. 16, 2012

(86) PCT No.: PCT/US2012/055680
§ 371 (c)(1),
(2) Date: Mar. 13, 2014

(87) PCT Pub. No.: WO2013/040529
PCT Pub. Date: Mar. 21, 2013

(65) Prior Publication Data
US 2014/0343857 A1 Nov. 20, 2014

Related U.S. Application Data

(60) Provisional application No. 61/535,517, filed on Sep. 16, 2011.

(51) Int. Cl.
*G01V 8/12* (2006.01)
*G01V 8/20* (2006.01)
(Continued)

(52) U.S. Cl.
CPC .............. *G01V 5/102* (2013.01); *G01V 5/045* (2013.01); *G01V 5/101* (2013.01); *G01V 5/0069* (2016.11);
(Continued)

(58) Field of Classification Search
CPC . G01V 5/04; G01V 5/10; G01V 5/101; G01V 5/102; G01V 5/104; G01V 5/105;
(Continued)

(56) References Cited

U.S. PATENT DOCUMENTS 4,191,884 A * 3/1980 Scott ...................... G01V 5/102
250/269.8
5,105,080 A 4/1992 Stoller et al.
(Continued)

FOREIGN PATENT DOCUMENTS

RU 2262124 C1 10/2005
WO WO2009020996 * 2/2009
(Continued)

OTHER PUBLICATIONS

Adolph et al. "Saturation Monitoring with the RST Reservoir Saturation Tool," Oilfield Review, vol. 6, No. 1, pp. 29-39, Elsevier, Jan. 1994.
(Continued)

*Primary Examiner* — Gregory J Toatley, Jr.
*Assistant Examiner* — Lynda Dinh
(74) *Attorney, Agent, or Firm* — Michael Dae

(57) ABSTRACT

Methods and systems are described for using pulsed neutron ?-ray spectroscopy to measure formation water salinity from within a borehole. Through generating a cross-plot of data-
(Continued)

base values of ratios of spectroscopically determined yields of hydrogen (H) and chlorine (Cl) from two detectors, deriving apparent salinities therefrom, formation and borehole water salinities can be determined.

17 Claims, 8 Drawing Sheets

(51) Int. Cl.
G01V 5/10 (2006.01)
G01V 5/04 (2006.01)
G01V 5/00 (2006.01)

(52) U.S. Cl.
CPC ............ G01V 5/10 (2013.01); G01V 8/12 (2013.01); G01V 8/20 (2013.01)

(58) Field of Classification Search
CPC ........ G01V 5/0069; G01V 5/045; G01V 8/12; G01V 8/20
USPC .......................................... 702/6, 8
See application file for complete search history.

(56) References Cited

U.S. PATENT DOCUMENTS

| | | | |
|---|---|---|---|
| 6,207,953 B1* | 3/2001 | Wilson | G01V 5/104 250/269.4 |
| 7,937,222 B2 | 5/2011 | Donadille et al. | |
| 8,849,573 B2* | 9/2014 | Zhang | G01V 5/04 250/269.4 |
| 2007/0255500 A1* | 11/2007 | Pita | G01V 1/30 702/11 |
| 2010/0327154 A1 | 12/2010 | Vaeth et al. | |

FOREIGN PATENT DOCUMENTS

| | | |
|---|---|---|
| WO | 2010039121 A1 | 4/2010 |
| WO | 2010039122 A1 | 4/2010 |

OTHER PUBLICATIONS

Albertin et al. "The Many Facets of Pulsed Neutron Cased-Hole Logging," Oilfield Review, vol. 8, No. 2, pp. 28-41, Elsevier, Summer, 1996.
International Search Report for International Application No. PCT/US2012/055680 dated Dec. 20, 2012.
Al-Sunbul, et al. "Quantifying Remaining Oil by Use of Slimhole Resistivity Measurement in Mixed Salinity Environments—A Pilot Field Test", paper SPE 97489, Dec. 2005, pp. 1-9.
Eyvazzadeh et al. "Modern Carbon/Oxygen Logging Methodologies: Comparing Hydrocarbon Saturation Determination Techniques," SPE 90339, Sep. 2004, pp. 1-14.
Ma, et al. "Cased-Hole Reservoir Saturation Monitoring in Mixed-Salinity Environments—A New Integrated Approach," paper SPE 92426, Mar. 2005, pp. 1-10.
Plasek, et al. "Improved Pulsed Neutron Capture Logging with Slim Carbon-Oxygen Tools: Methodology," SPE 30598, Oct. 1995, pp. 729-743.
Roscoe, et al. "A New Through-Tubing Oil-Saturation Measurement System," SPE 21413, Nov. 1991, pp. 659-668.

* cited by examiner

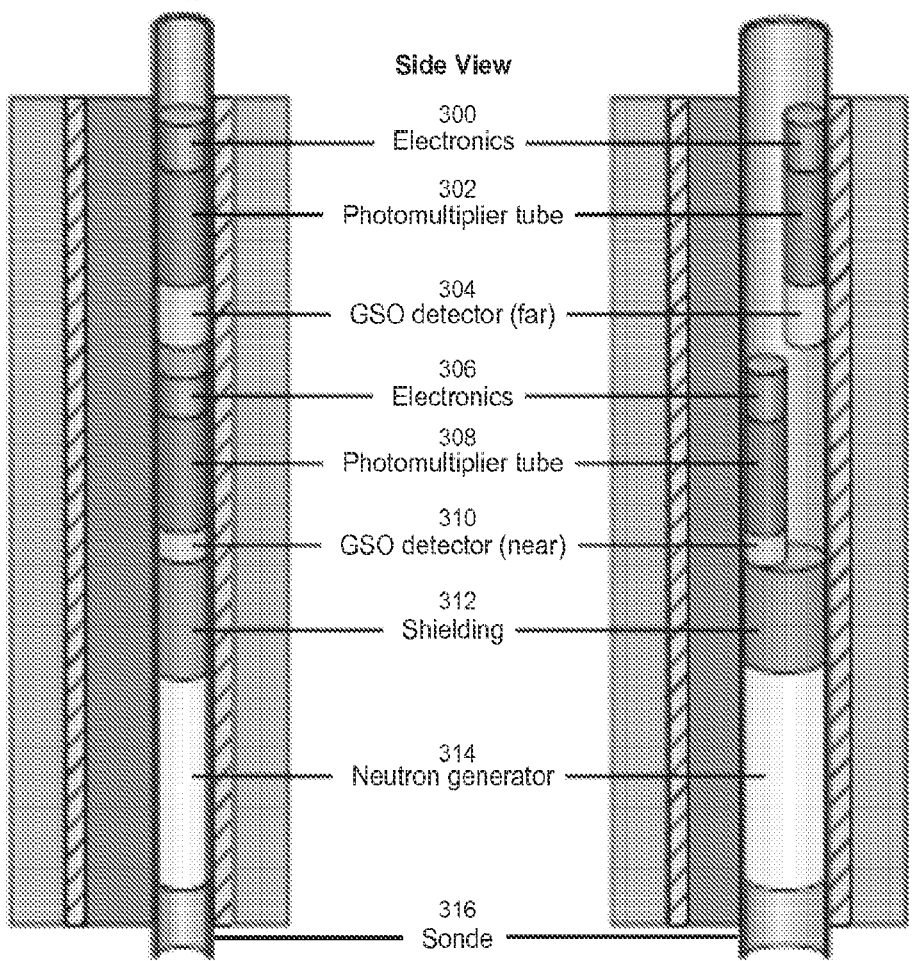
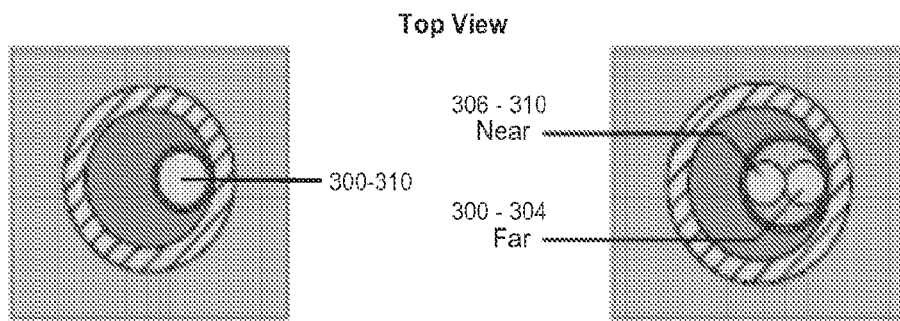
Figure 1: Schematic views of the RST-C (left) and RST-D (right) pulsed neutron tools are displayed, showing the relative positions of the near and far detectors and the pulsed neutron source. The additional back shielding for each detector of the RST-D and its bow spring are not shown.

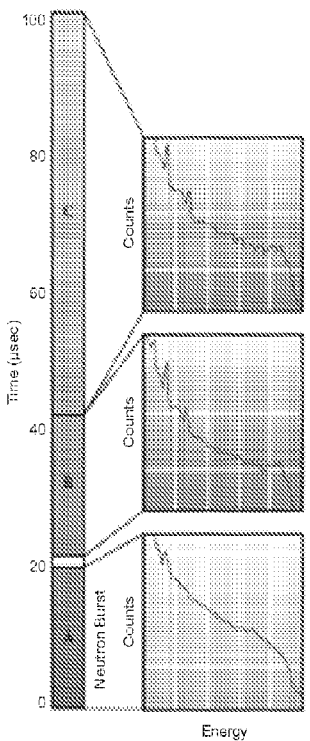

Figure 2: Displayed are γ-ray energy spectra obtained at three different times with respect to the neutron burst. Time period, or gate, A at bottom occurs during the neutron burst and comprises the inelastic gate. Gates B and C are obtained after the neutron burst, where gate C is the capture gate.

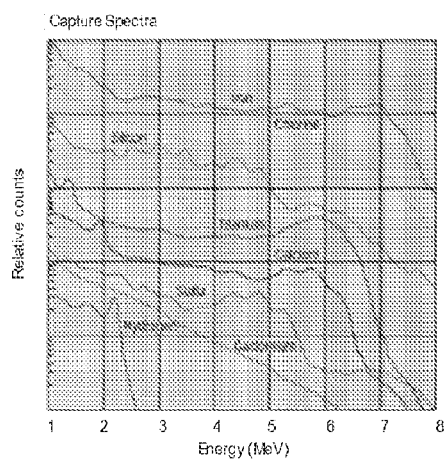

Figure 3: These are γ-ray energy spectra from individual elements measured in the laboratory and are called elemental standards. They are the capture spectra obtained after the neutron burst. Note the spectra for chlorine and hydrogen.

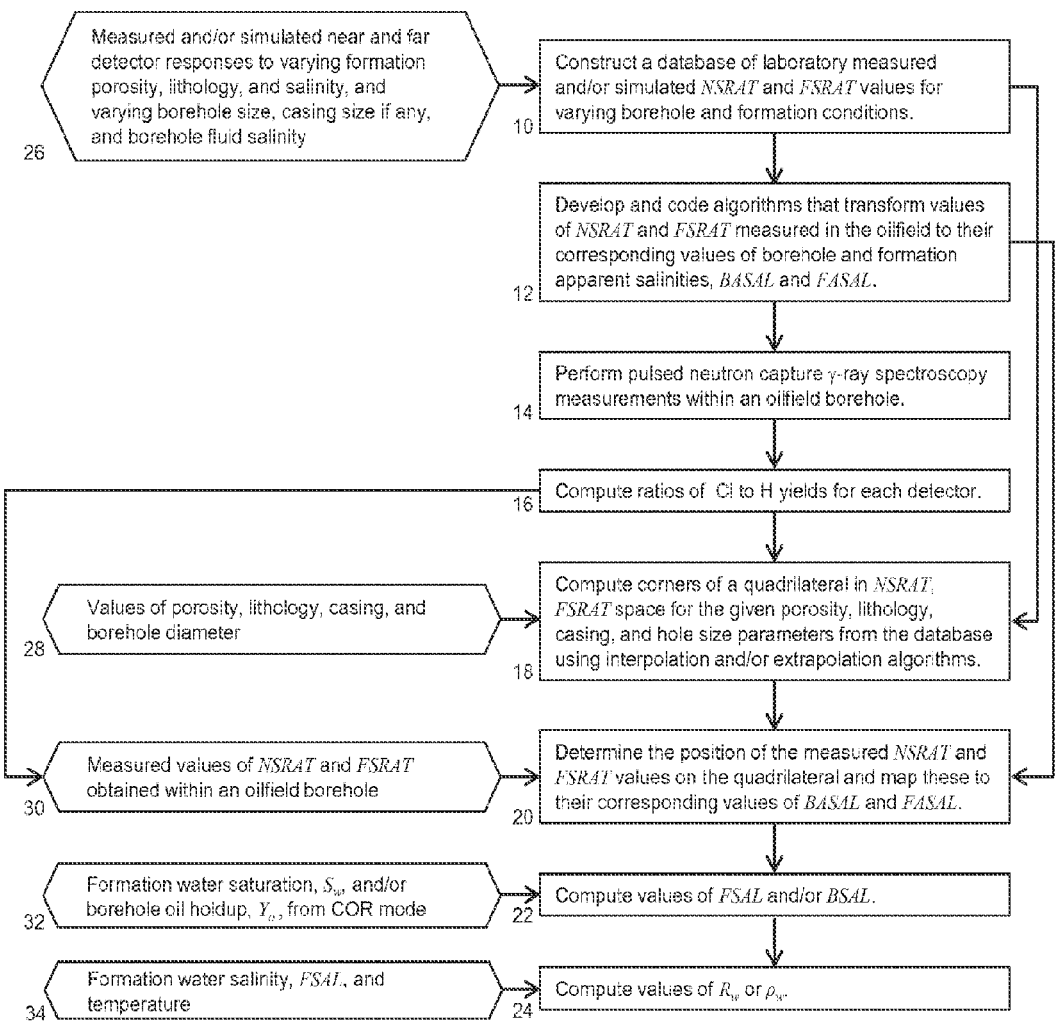
Figure 4: This is a flow chart that displays the necessary steps to produce a measurement of formation water salinity.

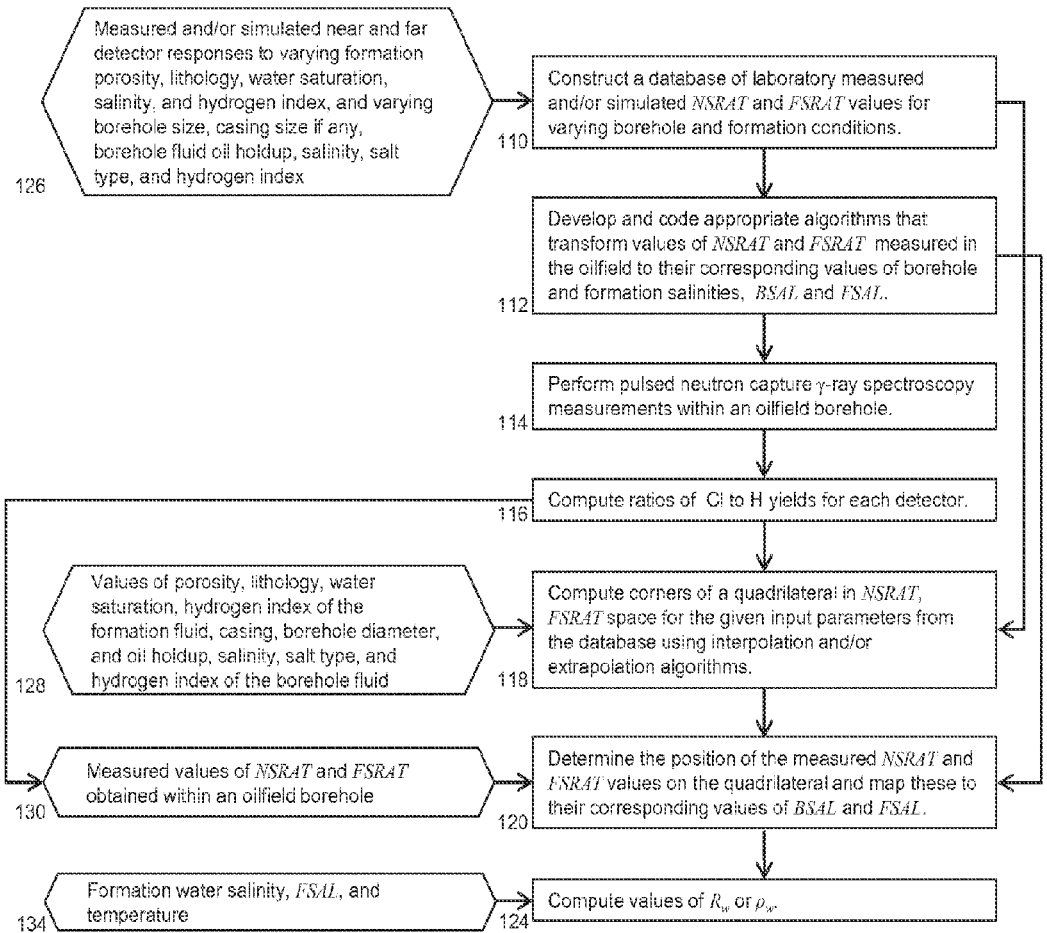
Figure 5: This is a flow chart that displays an alternative workflow to that presented in Fig. 4. $S_v$ is taken into account at the beginning of the workflow instead of the end.

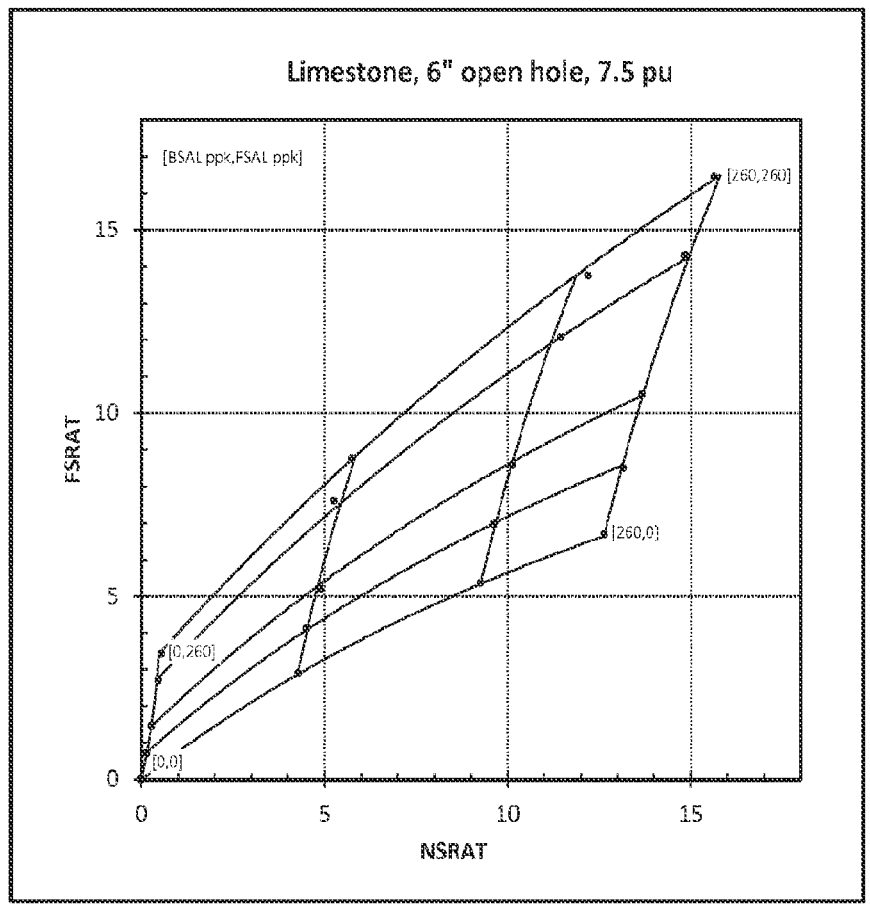
Figure 6: This is an example of a cross-plot of *NSRAT* and *FSRAT* values from the database for the conditions of limestone formation of 7.5 pu porosity and 6 inch diameter open borehole. The values of borehole and formation fluid salinities, *BSAL* and *FSAL*, are indicated by the square brackets.

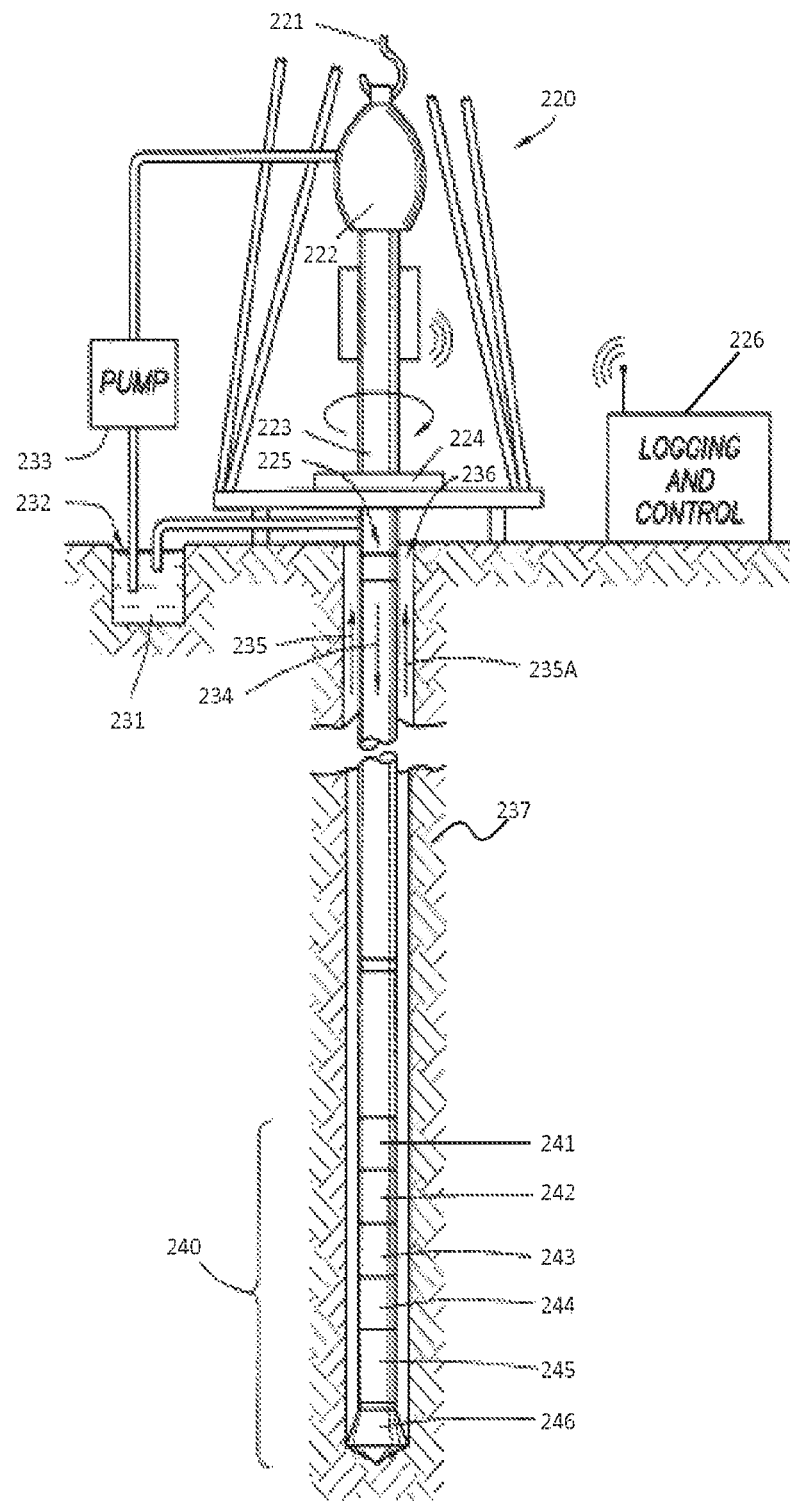
Figure 7: This is an example while-drilling wellsite system.

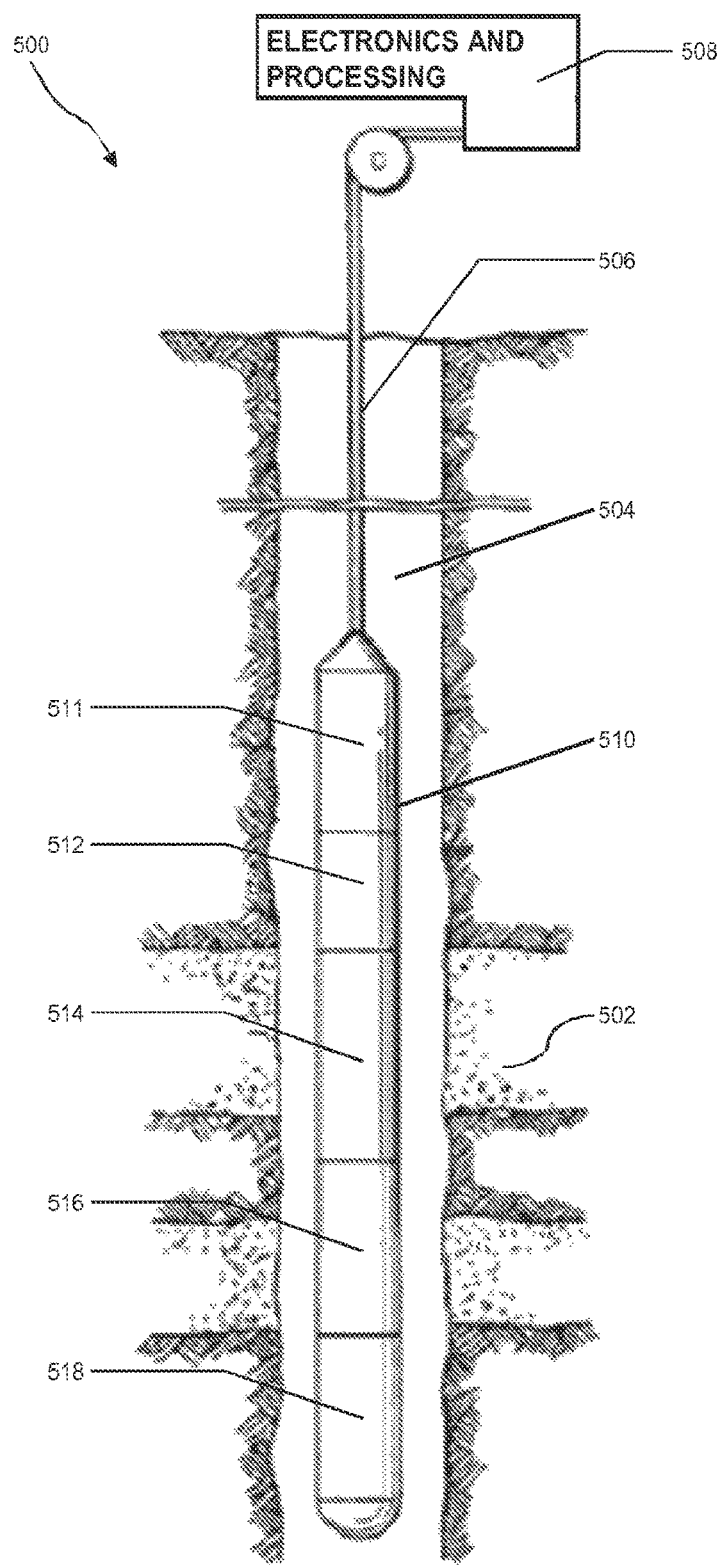
Figure 8: This is an example wireline wellsite system.

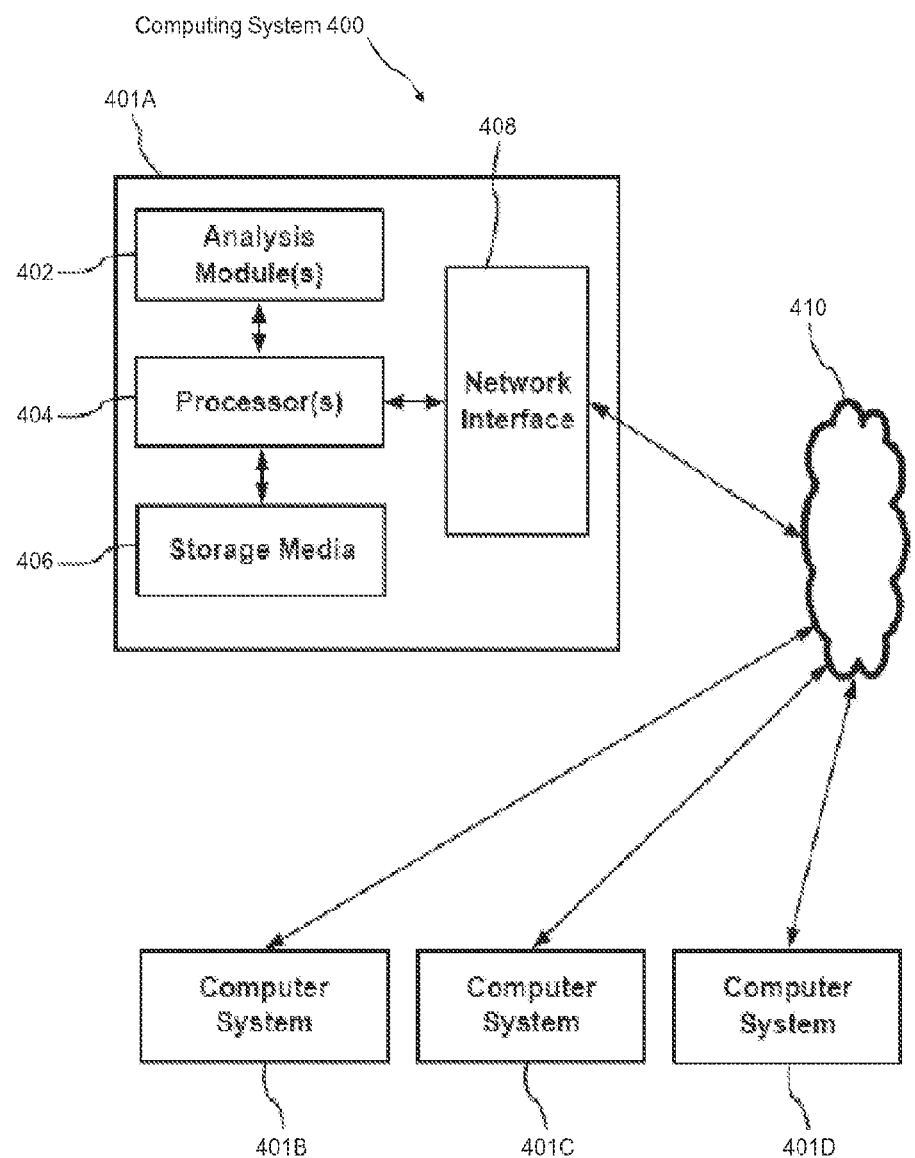
Figure 9: This is an example computer system that may be used in some example implementations of a method according to the present disclosure.

METHOD FOR MEASURING FORMATION WATER SALINITY FROM WITHIN A BOREHOLE

BACKGROUND

This disclosure relates generally to the field of downhole measurements. More specifically, the disclosure relates to using pulsed neutron gamma-ray spectroscopy to measure formation water salinity from within a borehole.

Hydrocarbons are found in porous or fractured rock and are typically accompanied by water beneath. Hydrocarbon and water are also found together in their undisturbed state and particularly after disturbance by hydrocarbon production operations. Subsurface water at the depths one may find hydrocarbons typically has a high concentration of dissolved salt.

In the exploration for hydrocarbons and their subsequent production it is the practice to make measurements of subsurface rock and fluid properties from within boreholes. The instruments used to perform these measurements are varied and make use of different physics principles. Some of the instruments are sensitive to the presence of salt in the water and others are not. For those that are sensitive to salt, it may be important to account for the amount of salt in the water, the water salinity, or accommodate some amount of error in the measurement of the rock or fluid properties due to an incorrect accounting of the salinity.

An example of a borehole measurement instrument that is sensitive to the presence of salt in water is the borehole resistivity sonde, which measures the electrical resistivity of the fluid in the pores of the rock. The water saturation, $S_w$, which is the fraction by volume of water within the pores, is inferred from the resistivity measurement. Salt in the water determines water resistivity; low water resistivity results from high salinity and high water resistivity results from low to zero salinity. Interpreting the measurement of the borehole resistivity sonde to obtain water saturation often requires knowledge of the water resistivity. Hence the accuracy of the reported water and hydrocarbon saturations are dependent on the accuracy of the estimated or measured formation water salinity. An example of inaccurate water saturation measured by a resistivity sonde in conditions of unknown water salinity is given in Eyvazzadeh, R. Y., O. Kelder, A. A. Hajari, S. M. Ma, and A. M. Behair, "Modern Carbon/Oxygen Logging Methodologies: Comparing Hydrocarbon Saturation Determination Techniques", SPE 90339, September, 2004.

Values for the salinity of the formation water surrounding a borehole are typically based on one or several fluid samples taken within that borehole, a single sample of produced fluids from that borehole taken at the surface, or a measurement taken at a different well within the same reservoir. These practices are fraught with many opportunities for error in the salinity.

The questionable estimates of salinity are further compromised by the widespread practice in mature reservoirs of injecting water from various sources into the reservoir in order to maintain or restore reservoir pressure and to displace oil in the direction of producing wells. The injected water may be salt-free (fresh) surface water, low-salinity sea water, high-salinity produced water from the same or neighboring reservoirs, or combinations of these. The consequence of water injection is formation water salinity that is changing both in time and space. The salinity will be different from well to well, within the same well, and will change over time. This condition is referred to as mixed salinity. Mixed salinity is a significant source of error for interpretation of the data from borehole measurement sondes that are sensitive to the presence of salt in the formation water.

Certain conventional methods for obtaining formation water salinity measurements exist, each with certain disadvantages and weaknesses. One method is the formation tester sample method. In this technique, a rubber pad is pressed against the wall of a small section of an uncased borehole at a particular depth. The rubber pad forms a rough seal against the formation, ideally a formation with a coating of smeared drilling mud known as mud cake. A small aperture at the center of the pad allows access from the formation to a pump and sample chamber within the sonde. Formation fluid is pumped through the sonde for some minutes to allow removal of borehole fluids from the near borehole formation and allow access to undisturbed formation fluid. After this cleanup period, access is given to the sample chamber via a valve and a sample of the formation fluid is collected for later transport to the surface where a laboratory analysis is performed.

This method is able to determine accurate formation water salinity, and is routinely used during the early life of a well when there is no casing in place. Samples are not likely to be taken once the well has been cased (though it is possible with a cased-hole formation tester), the well is in production, and the time-dependent effects of mixed salinity due to water injection become apparent. The method is usually not applied to producing wells because of the large outside diameter of the sonde and the requirement of a mud cake to seal between the formation and the rubber pad. In addition, it is usually an expensive and time consuming operation that may require a workover rig. When it is done, a very limited number of samples are taken at depths judged to be of high importance.

A second method is the bottom hole sample method. This technique is less complex than the formation tester sample in that it does not have a rubber pad forming a seal with the formation. It comprises a sample chamber with valve that is lowered into the borehole. Any sample collected is of the borehole fluid resulting from production of the well, and is not a true formation fluid sample. Borehole fluid within a producing well can be a mixture of fluids from different layers of the formation. The effect of mixing can be resolved with the additional measurement of fluid flow rate at the same depths as the samples were taken or continuously with depth.

This technique has the advantages of lower cost than the formation tester sample and access to producing wells. Its disadvantages are a larger error in the formation water salinity due to mixing and having access to formation fluids only at the depths where perforations in the casing exist.

A third method is the wellhead sample method. This technique, which involves taking samples of fluid at the head of a producing well, is the least complex and lowest cost measurement. It is also the least representative of the formation water salinity as it is a mixture of the fluids from all producing layers or perforated zones.

A fourth method is to obtain salinity information from a nearby well. In some cases, no measurement of formation water salinity is made for a particular well and a value, based on information from nearby wells, judged to be representative of the reservoir or portion of the reservoir is used for interpretation purposes. This method may provide qualitative information of formation water salinity and can have significant accuracy issues depending on the circumstances.

From the perspective of providing accurate input for the interpretation of data from borehole measurements that are sensitive to the presence of salt, all of these conventional methods suffer from a sparseness of data. A few, or one, or even no measurements of salinity are taken as representative of entire sections of a borehole, when in reality there may be gradients in the salinity over given sections of the borehole and from well to well, and there may be changes with time.

Accordingly, there is a need in the art for methods and systems for obtaining formation water salinity measurements from within a borehole that overcome one or more of the deficiencies that exist with conventional methods.

SUMMARY

A method according to one aspect of the disclosure for determining formation water salinity includes using measurements of formation characteristics acquired from a pulsed neutron tool having at least two detectors. A cross-plot is generated forming a quadrilateral from a database of ratios of spectroscopically determined yields of hydrogen (H) and chlorine (Cl) from a near spaced detector and a far spaced detector. Formation and borehole apparent salinities are determined from the cross-plot. Water saturation and oil holdup are determined. Formation water salinity and borehole water salinity are determined from the apparent salinities, water saturation, and oil holdup.

BRIEF DESCRIPTION OF THE DRAWINGS

FIGS. 1A through 1D show cross section and top views of example pulsed neutron tools.

FIG. 2 shows example neutron energy spectra in various time windows during and after a pulsed neutron burst.

FIG. 3 shows example laboratory measured capture gamma-ray (γ-ray) spectra for various chemical nuclei.

FIG. 4 shows a flow chart of one example process according to the present disclosure.

FIG. 5 shows another example process according to the present disclosure.

FIG. 6 shows a quadrilateral generated according to the example process of FIG. 4 or FIG. 5.

FIG. 7 shows drilling instrumentation that may include an example pulsed neutron well logging instrument.

FIG. 8 shows wireline cable conveyed instrumentation that may include an example pulsed neutron well logging instrument.

FIG. 9 shows an example computer system that may be used in some example implementations of a method according to the present disclosure.

DETAILED DESCRIPTION

The invention provides systems and methods for using pulsed neutron γ-ray spectroscopy to measure formation water salinity from within a borehole. Various example methods and systems will now be described with reference to FIGS. 1-8, which depict representative or illustrative embodiments of technology consistent with the present disclosure.

Pulsed neutron γ-ray spectroscopy is described in detail in a number of references, such as Plasek, R. E., R. A. Adolph, C. Stoller, D. J. Willis, E. E. Bordon, and M. G. Portal, "Improved Pulsed Neutron Capture Logging with Slim Carbon-Oxygen Tools: Methodology", SPE 30598, October, 1995; Roscoe, B. A., C. Stoller, R. A. Adolph, et al., "A New Through-Tubing Oil-Saturation Measurement System", SPE 21413, November, 1991; Adolph, R. A., C. Stoller, J. Brady, et al., "Saturation Monitoring with the RST Reservoir Saturation Tool", Oilfield Review, v. 6, no. 1, pp. 29-39, Elsevier, January, 1994; Albertin, I., H. Darling, M. Mandavi, R. E. Plasek, et al., "The Many Facets of Pulsed Neutron Cased-Hole Logging", Oilfield Review, v. 8, no. 2, pp. 28-41, Elsevier, Summer, 1996; and Darwin V. Ellis and Julian M. Singer, "Well Logging for Earth Scientists", Springer, The Netherlands, 2007, the entire disclosures of which are hereby incorporated by reference herein. One aspect of the pulsed neutron γ-ray spectroscopy technology relating to the present disclosure includes the analysis of γ-ray energy spectra where these γ-rays are emitted by nuclei in the formation after the capture of thermal neutrons.

FIGS. 1A through 1D depict certain elements of pulsed neutron tools, according to example embodiments. In certain embodiments, such as shown in FIG. 1B the pulsed neutron tool can be one known as the Reservoir Saturation Tool (RST-D) instrument, which is a trademark owned by an assignee of the present disclosure. The illustrated elements of the tool include: 1) a source of high-energy pulsed neutrons 314, 2) shielding 312 between the source 314 and 3) a near γ-ray detector 310 that is proximate to and above the neutron source 314 and which faces the borehole, and has back-shielding (not shown) to reduce its sensitivity to the formation. The detector 310 may be coupled to a photomultiplier tube 308 with associated electronics 306. The tool may include 4) a far γ-ray detector 304 that is farther from the neutron source 314 and above it, faces the formation, and has back-shielding (not shown) to reduce its sensitivity to the borehole. The far detector 304 may include a photomultiplier tube 302 and associated electronics 300. A bow spring (not shown) attached to the outside of a sonde housing 316 and diametrically opposite the far detector 304 may ensure proper orientation of near and far detectors with respect to borehole and formation.

A variation on the RST-D, the RST-C shown in FIG. 1A, and which is also a trademark owned by an assignee of the present disclosure, generally can be less suited for the measurement of formation water salinity. However, it can still provide a measurement with lesser accuracy. The components of the RST-C are identified by reference numerals corresponding to those described above with reference to the RST-D. Some boreholes have internal restrictions that preclude use of the 2½ inch diameter RST-D. Therefore, the 1¹¹⁄₁₆ inch diameter RST-C may be a viable option. To achieve the smaller diameter, the RST-C has both detectors disposed substantially on the sonde's 316 central axis, foregoes back shielding of both detectors, and may forego the bow spring, although a bow spring may be used. In this case the enhanced sensitivity of the far detector to the formation and the near detector to the borehole can result largely (or solely) from the spacings of the detectors 304, 310 from the source 314. The near detector 310, being closer to the source 314, generally derives its measurement predominantly from the region immediately surrounding the source 314 and the near detector 310. The far detector 304, being further from the source 314, is generally more sensitive to neutron interactions that have occurred at a greater distance from the source 314 and the far detector 304, hence, further into the formation from the wall of the borehole.

FIGS. 1C and 1D show, respectively, top views of the tools shown in FIGS. 1A and 1B.

It should be clearly understood that the example tools shown in FIGS. 1A and 1B have certain features that are not essential to methods according to the present disclosure. For example, any pulsed neutron tool with at least two detectors each having a different sensitivity to the borehole and the formation could be used. Such a tool could include a tool with a borehole facing and a formation facing detector, back-to-back at the same or similar longitudinal spacings. In another example, the detectors could be disposed on opposite longitudinal sides of the neutron generator.

In such configurations, the detectors may have the same or different longitudinal spacing from the neutron source. In the case of the detectors having the same longitudinal spacing from the source, one detector would be preferentially oriented toward the borehole and the other oriented toward the formation. In the case of different detector spacings, preferential detector orientation, although beneficial, may be omitted.

In the example method disclosed herein, called the carbon-oxygen ratio mode (COR mode), high-energy neutrons are emitted from the source 314 during a selected duration burst. The neutron burst is followed by a period during which no neutrons are emitted from the source 314. This pattern may be repeated for as long as the tool is operating. The RST-D and RST-C use a neutron burst of 20 microseconds (µs) duration and a source-off period of 80 µs duration, but other time durations for the burst and source-off periods may be used.

Some of the emitted neutrons undergo multiple collisions, in particular with hydrogen nuclei, i.e., protons, which may eventually reduce the energy of the colliding neutrons to thermal energy. The thermal neutrons may react with the nuclei of any elements in the formation and borehole, such that they may be captured by these nuclei to form compound excited nuclei. These compound excited nuclei may decay to their ground state with the emission of characteristic γ-rays called capture γ-rays.

Those capture γ-rays with trajectories that intersect the near or far detectors are detected by those detectors mostly during the timing gate labeled "C" in FIG. 2, which displays γ-ray energy spectra obtained at three different times with respect to the neutron burst, according to an example embodiment. There may be some capture γ-rays in gate A, however γ-rays in gate A may for the most part result from inelastic collisions of high-energy neutrons with nuclei of the materials in the borehole and surrounding formations. There may also be capture γ-rays detectable in timing gate B. The energy deposited in a detector by a single γ-ray is analyzed and a histogram of γ-ray energies versus frequency of occurrence may be generated by summing the detected γ-rays in each energy level over many burst sequences. These histograms are the γ-ray energy spectra determined separately for each detector and are the near capture spectrum and far capture spectrum. Capture spectra have characteristic shapes and magnitudes as depicted in FIG. 3, which shows γ-ray energy spectra from individual elements measured in the laboratory. These spectra are called elemental standards according to an example embodiment for the individual elements listed in FIG. 3. Measured capture spectra in borehole conditions have shapes and magnitudes that are a linear combination of the elemental standard spectra, and result from capture γ-ray emission by the elements in the borehole and formation.

Different borehole and formation conditions result in different near and far capture γ-ray spectra. In one example, linear least squares regression may be used to determine the coefficients for each element in a linear combination which provides the relative spectral yields, i.e. the fractional contribution of each standard spectrum to the total, where the total spectrum is normalized to 1. In particular, for the purpose of the present disclosure, it may be possible to determine the relative yields of Cl and H as observed by the spectra from each detector. The Cl yield is indicative of the presence of salt within water, while the H yield is indicative of the presence of hydrocarbon and/or water. The Cl and H yields determined from the near detector capture γ-ray spectra will have sensitivity to both the borehole and formation fluids, with a bias toward the borehole fluids. Similarly, the Cl and H yields determined from the far detector capture γ-ray spectra will have sensitivity to both the borehole and formation fluids, with a bias toward the formation fluids.

The determined H yields are complicated by the fact that oils of different compositions have different densities of hydrogen atoms (number of hydrogen atoms per unit of volume). The concept of hydrogen index, HI, is relevant to this topic. Hydrogen index is defined in references such as Joseph R. Hearst, Philip H. Nelson and Frederick L. Paillet, "Well Logging for Physical Properties", Wiley, England, 2000, hereby incorporated by reference herein, as the volume fraction of fresh water at standard temperature and pressure that would contain the same number of hydrogen atoms as a given volume of hydrocarbon or saline water. Fresh water has HI=1, saline water has HI<1, heavy oils have HI≥1, and light oils have HI≤1. A formation fluid with HI≥1 may cause an underestimate of formation apparent salinity by the present method. Fortunately, the majority of known produced oils have a hydrogen index close to 1, so that the effect is small in most cases and therefore, the following description need not account for the effect of HI≠1. However, an a priori knowledge of oil composition may be used to correct for this effect.

As described in references such as Ma, S. M., A. A. Al-Hajari, G. Berberian and R. Ramamoorthy, "Cased-Hole Reservoir Saturation Monitoring in Mixed-Salinity Environments—A New Integrated Approach", paper SPE 92426, March 2005, hereby incorporated by reference herein, ratios of Cl to H yield (NSRAT and FSRAT) can be computed for each detector:

$$NSRAT = \frac{Y_{Cl\,Near}}{Y_{H\,Near}} \quad (1)$$

$$FSRAT = \frac{Y_{Cl\,Near}}{Y_{H\,Far}}$$

where $Y_{Cl\,Near}$ and $Y_{H\,Near}$ are the relative yields of Cl and H determined from the near detector and likewise for the far detector. NSRAT and FSRAT are abbreviations for Near and Far Salinity Ratio.

Other aspects of the formation water salinity interpretation are not addressed in Ma et al. (with one exception as noted below) and are within the scope of the present disclosure. FIG. 4 is a flow chart that displays example steps to produce a measurement of formation water salinity, according to an example embodiment. It is referred to in the following description of the method.

One element of this example method is a database of laboratory measured and/or modeled NSRAT and FSRAT values for varying borehole and formation conditions. It is generally desirous for the various borehole and formation conditions represented in the database to be very similar to the conditions one expects to encounter in an oilfield. In example embodiments, a set of borehole and formation parameters of importance to a pulsed neutron capture γ-ray spectroscopy measurement are borehole diameter, open hole or cased hole, casing size if cased hole, borehole fluid (oil or water or a mix thereof under flowing conditions), borehole water salinity if water, formation lithology (sandstone, limestone, or dolomite), formation porosity, formation water saturation and oil saturation, and formation water salinity. Each of these parameters is multi-valued with some such as casing size having discrete values and others such as formation porosity varying continuously over a range. In some embodiments, such a database may contain most or all permutations of these parameters. Additional complexities can optionally be considered for a database; for example, eccentricity of the casing within the borehole, production tubing within the casing, and alternative lithologies may also be used.

Because the conditions across all oilfields vary widely and have most possible permutations of the relevant parameters, it may not be practical to have a database that addresses all wells. One must therefore create a limited database that addresses those wells most likely to benefit from a measurement of formation water salinity. In some embodiments, this can include those wells in reservoirs undergoing water injection and having mixed salinities.

The database may be populated with laboratory measurements or with computer simulated values. Laboratory measurements can be performed in multiple large steel tanks that contain broken rock and sand of a specific porosity and lithology representative of one formation. Along the central vertical axis of each tank can be a permanently installed thin-walled steel cylinder of some diameter that may not contain rock or sand and delineates a simulated borehole of that diameter or drill bit size. The volume of the tank outside the cylinder and the cylinder volume can be isolated from each other so that they can be filled with different fluids, such as oil or water of different salinities. Fluids within any tank or borehole may be changed with the aid of components such as pumps and drains. Sections of various sized casings may be temporarily placed within the borehole. The casings may have cement jackets. The RST-D pulsed neutron measurement sonde can be placed within the casing and the measurement is performed. In some embodiments, the two measured values, NSRAT and FSRAT are added to the database.

Computer simulated values of NSRAT and FSRAT may augment or be used in place of laboratory measured values. In example embodiments, computer simulations can be performed with the MCNP (Monte Carlo n-Particle) computer program developed at the Los Alamos National Laboratory or similar program, as shown at 26 in FIG. 4. Inputs to the program can include the geometry and composition of the pulsed neutron sonde, the borehole with its hardware and fluid, and the formation rock and fluid; all for a single database configuration. Construction of the database is shown at 10 in FIG. 4. Other inputs can include a description of the neutron source: particle type, particle energy spectrum, and source location and geometry. Also serving as input can be a very large database of nuclear cross-sections of possible neutron and γ-ray interactions with the nuclei of elements in the sonde, borehole, and formation. Output from the program can include the computed near and far detector γ-ray spectra, from which NSRAT and FSRAT can be computed via spectral processing. The two simulated values, NSRAT and FSRAT, can then be added to the database. Comparisons between measured and computed values for the identical configuration may be made in order to validate or improve the accuracy of the computed values and adjust input to the computer program accordingly.

At 12 in the flow chart in FIG. 4, next in the present example method can be development and coding of appropriate algorithms that transform measured values of NSRAT and FSRAT to their corresponding values of formation and borehole apparent salinities, FASAL and BASAL. The term "apparent" refers to the fact that FASAL and BASAL are average salinities over the hydrocarbon and water components of the fluids; i.e. they are not the salt concentrations within water. The example algorithm makes use of a cross-plot method with quadrilateral. For a single set of borehole and formation parameters excluding salinities, a cross-plot is made of NSRAT and FSRAT using values from the database that span the available range. By interpolation within the quadrilateral and/or extrapolation outside the quadrilateral one may determine unique values of FASAL and BASAL. The foregoing method is described in detail in U.S. Pat. No. 5,105,080 issued to Stoller et al. incorporated herein by reference.

In another embodiment of step 12 in the flow chart in FIG. 4, the database of NSRAT, FSRAT, BASAL and FASAL values is represented as sets of polynomial coefficients. Instead of using the aforementioned cross-plot method with quadrilateral to perform the transformation from NSRAT and FSRAT to BASAL and FASAL, the BASAL and FASAL values are computed directly from the polynomial coefficients, NSRAT, FSRAT, and any other property, e.g. porosity, with which the database is parameterized.

At 14, pulsed neutron capture γ-ray spectroscopy is performed in a borehole. At 16, ratios of Cl to H yields are computed for each of the near and far detectors (FIGS. 1A and 1C). At 28, values of porosity, rock mineral composition (lithology) and borehole diameter may be entered into the algorithm to compute corners of a quadrilateral, at 18. Values of NSRAT and FSRAT may be used to construct the quadrilateral given the parameters entered at 28. At 30, measured values of NSRAT and FSRAT may be entered to determine, at 20, the positions thereof on the quadrilateral. At 32, formation water saturation, $S_w$, and/or oil holdup, $Y_o$, may be entered so that values of FSAL and/or BSAL may be computed, at 22. Oil holdup is the volume fraction of oil within the borehole fluid. Given a determined formation water salinity (FSAL), and borehole temperature at the depth of measurement, values of water resistivity and/or density may be computed, at 24.

FIG. 5 shows a different example of a method within the scope of the present disclosure. In the example of FIG. 5, the functions performed at 126, 110, 112, 114, 116, 118, 120 and 124 correspond to the functions performed at 26, 10, 12, 14, 16, 18, 20 and 24 in FIG. 4. In the example of FIG. 5, values of porosity, lithology, water saturation, hydrogen index of the formation fluid, casing, borehole diameter and oil holdup, salinity, salt type, and hydrogen index of the borehole fluid may all be entered, at 128, to the computation of the quadrilateral corners, at 118. The remaining data entry, at 130 and 134 corresponds to the data entry at 30 and 34 in FIG. 4. The foregoing will be explained in more detail below.

An example of a cross-plot is shown in FIG. 6, which is a cross-plot of NSRAT and FSRAT values from the database for the conditions of limestone formation of 7.5 pu porosity and 6 inch diameter open hole, according to an example embodiment. The cross-plot forms a quadrilateral where the four endpoints correspond to the maximum and minimum values of formation and borehole apparent salinities. Note that FIG. 6 has the quadrilateral endpoints and some intermediate points labeled according to their corresponding values of borehole water salinity, BSAL, and formation water salinity, FSAL. This is possible in example embodiments because measured and modeled points within the database were obtained with known values of water saturation, $S_w=1$, and oil holdup, $Y_o=0$. A pair of values of NSRAT and FSRAT obtained by measurement in an oilfield borehole may be added to the plot.

With a database constructed and algorithms in place, one may proceed to the application phase beginning at step 14 of FIG. 4. Step 14 entails acquisition of data with the RST-D tool in an oilfield borehole of unknown salinity. Per step 16, from this acquired data one extracts the Cl and H yields, $Y_{Cl\ Near}$, $Y_{H\ Near}$, $Y_{Cl\ Far}$, and $Y_{H\ Far}$ and computes the Cl and H ratios, NSRAT and FSRAT.

The next step indicated as step 18 in FIG. 4 is computation of an NSRAT and FSRAT quadrilateral that is specific to the given borehole conditions. The information of borehole size and casing size is provided along with the measured information of porosity and lithology, as indicated at 28. This step requires interpolation and/or extrapolation of the database to match the values of these parameters.

Step 20 of FIG. 4 entails mapping the measured values of NSRAT and FSRAT to their corresponding values of borehole apparent salinity, BASAL, and formation apparent salinity, FASAL. FASAL from the quadrilateral represents the formation water salinity only if the pore space is completely filled with water. As indicated in step 22 of FIG. 4, if $S_w<1$, then the true formation water salinity can be computed as FSAL=FASAL/$S_w$, (Eq. 8, Ma et al.) where $S_w$ is supplied. Likewise, it is possible to compute BSAL=BASAL/$(1-Y_o)$, where $Y_o$ is also supplied. Both $S_w$ and $Y_o$ can be computed from the inelastic mode acquisition of the RST-D and RST-C independent of a knowledge of the salinity as referenced in Roscoe et al. The uncertainty in both FSAL and BSAL will increase proportionally by the inverse of $S_w$ and $(1-Y_o)$, respectively.

In some embodiments, the effect of water saturation may be accounted for at the beginning of the workflow illustrated in FIG. 4 instead of at the end. In this implementation step 10 of FIG. 4, the database construction, is replaced by step 110 of FIG. 5 and includes variation of $S_w$ over the full range of expected values (typically from 0 to 1). In this way, one may obtain BSAL and FSAL directly from the quadrilateral transformation (step 120 of FIG. 5) and step 22 of FIG. 4 is eliminated. In a similar fashion, the effect on the measurement of varying oil holdup, the effect of HI≠1 due to the presence of very heavy or very light oil in the formation, or the effect of the presence of chloride salts other than sodium chloride in the borehole may be accounted for in the database construction portion of the workflow.

Finally, per step 24 of FIG. 4 or step 124 of FIG. 5, FSAL, may be applied to other borehole measurements that have a dependency on salinity.

An example of a borehole measurement sonde with sensitivity to formation water salinity is a resistivity tool, which measures the electrical resistivity (or conductivity) of the fluid in the pores of the rock.

In example embodiments, $S_w$ may be inferred from the resistivity measurement using relationships known in the art such as the Archie equation:

$$S_w = \left(\frac{R_w}{R_T}\frac{a}{\phi^m}\right)^{\frac{1}{n}} \quad (2)$$

where a, m, and n are rock properties (lithology factor, cementation exponent, and saturation exponent) determined from laboratory measurements or other means. $\phi$ is the porosity of the rock, $R_w$ is the water resistivity, and $R_T$ is the measured (true) formation resistivity.

Dependence of the reported $S_w$ on FSAL comes through $R_w$. Salt in the water determines water resistivity; low water resistivity results from high salinity and high water resistivity results from low to zero salinity. The borehole resistivity sonde requires knowledge of $R_w$ which can be computed from FSAL. Hence the accuracy of the reported water and hydrocarbon saturations are dependent on the accuracy of the estimated or measured FSAL.

A second example of a salinity dependent instrument is the borehole gravity sonde. The borehole gravity measurement provides the average density of all material in the vicinity of the sonde, which includes the formation water and any salt it may contain. In the interpretation of borehole gravity data the porosity of the formation, $\phi$, may be computed from the measured bulk density, $\rho_B$, as follows:

$$\phi = \frac{(\rho_B - \rho_M)}{(\rho_F - \rho_M)} \quad (3)$$

where $\rho_F$ is the density of the pore fluid and $\rho_M$ is the density of the rock matrix.

In the case where the pore fluid comprises oil and water, the above equation may be expanded to include the water density, $\rho_w$, the oil density, $\rho_o$, and the water saturation, $S_w$, as follows:

$$\phi = \frac{(\rho_B - \rho_M)}{(\rho_w S_w + \rho_o(1-S_w) - \rho_M)} \quad (4)$$

The water density, $\rho_w$, may depend upon the salt concentration with up to 30% effect for highly saline water. Therefore, an accurate knowledge of formation water salinity is important to determining an accurate porosity.

A more sophisticated interpretation of borehole gravity measurements uses a reservoir model-centric approach. This approach can utilize a priori information about the geological structure of the reservoir, porosity, and oil and water saturations. From this information, a 3-dimensional model of the reservoir bulk density can be constructed. The water density and therefore the formation water salinity affect the computed bulk density just as they did in the simpler interpretation above. In some embodiments, single values for FSAL and $\rho_w$ are assigned to the entire volume of the model, which is far from accurate.

Multiple models may be constructed that represent the reservoir at different times, with the intent of modeling the movement of fluids in the reservoir during the production phase of the life of a reservoir. Measurements of reservoir properties, including the bulk density obtained from the borehole gravity sonde are taken within multiple wells and at multiple times, and compared to the reservoir models. The models may then be adjusted to improve agreement with the measured data. A reservoir undergoing water injection will have mixed salinity which should be measured and then accounted for in the reservoir models. Failure to do so results in an incorrect model and consequent incorrect interpretation of fluid movement in the reservoir.

A third example of a salinity dependent instrument is the gamma-gamma (γ-γ) nuclear density sonde, which provides a measurement of bulk density, $\rho_B$, close to the borehole. This bulk density is used in the same way as the simple interpretation of the borehole gravity data to compute a formation porosity using equation (4). The porosity computation is therefore susceptible to a similar error arising from incorrect values of FSAL and $\rho_w$.

The γ-γ density measurement has a very shallow depth of investigation of a few inches compared to the much greater depth of investigation of many feet of the borehole gravity measurement. It therefore has a more complex susceptibility to mixed salinity because of the more complex movement of fluids in the vicinity of the borehole caused by the many disturbances in the formation created during the drilling, well completion, and fluid production operations, such as mixing of fluids during flowing and non-flowing conditions.

The depth of investigations of the γ-γ density measurement and the proposed measurement of formation water salinity using a pulsed neutron measurement sonde are comparable, so that application of FSAL from the pulsed neutron measurement to the computation of porosity using the γ-γ density measurement will give an accurate result.

An application of FSAL measured within the reservoir zone of a borehole and in multiple boreholes within a reservoir relates to a process called reservoir simulation. Reservoir simulation is concerned with fluid dynamics and attempts to compute the evolution of water, oil, and gas saturations, $S_w$, $S_o$ and $S_g$, by taking into account the production of these fluids to the surface as well as injection of fluids for pressure maintenance and oil sweep. Inputs to a reservoir simulation include the geometrical structure of the reservoir usually obtained from seismic measurements. Other inputs include properties of the rock such as porosity and permeability. In the simulation process, the volume of the reservoir is divided into thousands to billions of smaller volumes called cells. Reservoir properties are associated with each cell and may vary from cell to cell. Based on an initial set of inputs, the reservoir simulation computes the evolution of fluid saturations for each cell and also computes fluid production rates at defined wells.

The reservoir simulation will compute saturations and production rates from the past, but is useful for its ability to predict future saturations and production rates. In a process called history matching, comparisons are made between computed saturations and production rates for the past, and measured values of these properties also from the past. In cases where these differ significantly, adjustments to the input data may be made and the simulation rerun. This process is repeated until satisfactory agreement is reached between the computed and measured properties. Satisfactory agreement in the past is necessary to have confidence in the property values predicted by the simulation.

In another example embodiment, existing reservoir simulation programs allow for the input of formation water salinity and can compute its evolution. However, in the practice of reservoir simulation and the history matching portion of simulation, it is common to use a single value of FSAL throughout the volume of the reservoir model and for all times due to the lack of measured data. In the scenario of mixed salinities described above, a proper accounting of salinity in space and time within the reservoir simulation would provide an additional property with which to perform history matching. Measurements of formation water salinity would provide an additional input property to the simulation. Using salinity as an indicator of different sources of water allows more accurate determination of the movement of the water within the reservoir and in time. This is analogous to the practice of injecting dye at the entrance to an underwater cave and then finding exits to the cave wherever the dye emerges.

In some example embodiments, cross-well resistivity measurements can be made to monitor movement of a water flood through the reservoir. To accurately determine the saturation variation, it may be desirable to convert the inter-well resistivity maps to inter-well saturation maps. The salinity of the water can be assumed for this calculation. However, by combining a simulator (e.g., an ECLIPSE simulator, which is a trademark owned by an assignee of the present disclosure) that can track movement of fluids and salts—as referenced in U.S. Pat. No. 7,937,222 issued to Donadille et al.—with the above-described conversion process, and by using the measured formation water salinity variation at the boreholes as a history match constraint, a more accurate picture of the saturation variations in the reservoir can be obtained in some embodiments.

Although the foregoing examples are described in terms of cross plotting the raw data underlying the apparent salinity values, i.e. the ratios of Cl and H yields for the two detectors, and computing the apparent salinity values afterward, in other examples it is possible to cross plot, for example, apparent salinities. Also from Ma et al., one may obtain the following relationships:

$$ASAL_{Near} = \frac{(1000 * NSRAT)}{(\alpha_{Near} + NSRAT)} \qquad (5)$$
$$ASAL_{Far} = \frac{(1000 * FSRAT)}{(\alpha_{Far} + FSRAT)}$$

In Eq. (5), $ASAL_{Near}$ and $ASAL_{Far}$ are apparent salinities for the respective zones of investigation of the two detectors. $\alpha_{Near}$ and $\alpha_{Far}$ are detector specific sensitivity parameters that must be determined empirically.

As to the example methods presented previously, they are illustrative, and in other embodiments, certain steps can be performed in a different order, in parallel with one another, omitted entirely, and/or combined between different exemplary methods, and/or certain additional steps can be performed, without departing from the scope of the invention. Accordingly, such other embodiments are included in the invention described herein.

For example, the methods or means of conveyance for a pulsed neutron tool or any other downhole tool that can be used to perform certain aspects of the foregoing disclosure can include any methods or means of conveyance known to those of ordinary skill in the art having benefit of the present disclosure. FIG. 7 illustrates a wellsite system in which aspects of the present disclosure may be employed. The wellsite can be onshore or offshore. In this example system, a borehole is formed in subsurface formations by rotary drilling in a manner that is well known.

A drill string 225 is suspended within a borehole 236 and has a bottom hole assembly (BHA) 240 which includes a drill bit 246 at its lower end. A surface system 220 includes platform and derrick assembly positioned over the borehole 236, the assembly including a rotary table 224, kelly (not shown), hook 221, and rotary swivel 222. The drill string 225 is rotated by the rotary table 224 energized by means not shown, which engages the kelly (not shown) at the upper end of the drill string 225. The drill string 225 is suspended from the hook 221, attached to a traveling block (also not shown), through the kelly (not shown) and the rotary swivel 222 which permits rotation of the drill string 225 relative to the hook 221. As is well known, a top drive system could be used instead of the system shown in FIG. 7.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid to flow downwardly through the drill string 225 as indicated by the directional arrow 234. The drilling fluid exits the drill string via ports (not shown) in the drill bit 246, and then circulates upwardly through an annulus region 235 between the outside of the drill string 225 and the wall of the borehole 236, as indicated by the directional arrows 235 and 235A. In this well-known manner, the drilling fluid lubricates the drill bit 246 and carries formation cuttings up to the surface as it is returned to the pit 231 for recirculation.

The BHA 240 of the illustrated embodiment may include a measuring-while-drilling (MWD) tool 241, a logging-while-drilling (LWD) tool 244, a rotary steerable directional drilling system 245 and motor, and the drill bit 250. It will also be understood that more than one LWD tool and/or MWD tool can be employed, e.g. as represented at 243.

The LWD tool 244 is housed in a special type of drill collar, as is known in the art, and can contain one or a plurality of known types of logging tools. The LWD tool may include capabilities for measuring, processing, and storing information, as well as for communicating with the surface equipment. In the present example, the LWD tool 244 includes a pulsed neutron measuring tool similar in configuration to that shown in FIG. 1C, for example, adapted to fit in the special drill collar.

The MWD tool 241 is also housed in a special type of drill collar, as is known in the art, and can contain one or more devices for measuring characteristics of the drill string and drill bit. The MWD tool 241 further includes an apparatus 242 for generating electrical power to the downhole system. This may typically include a mud turbine generator powered by the flow of the drilling fluid, it being understood that other power and/or battery systems may be employed. In the present embodiment, the MWD tool 241 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 242 may also include a drilling fluid flow modulator for communicating measurement and/or tool condition signals to the surface for detection and interpretation by a logging and control unit 226. In the present example, the pulsed neutron source and detectors (FIG. 1A) may be offset from the centerline of the drill collar. In cases where the borehole is inclined from vertical, rotation of the drill string (or BHA if a drill string disposed motor is used) may be used to obtain measurements that are responsive preferentially to the borehole and preferentially to the formation by reason of the rotation and the fact that the drill string will tend to rest on the gravitational low side of the borehole.

Referring to FIG. 8, an example wireline tool 510 is shown that may be another environment in which aspects of the present disclosure may be implemented. The example wireline tool 510 is suspended in a wellbore 504 from the lower end of an armored multiconductor cable 506 that is spooled on a winch (not shown) at the Earth's surface. At the surface, the cable 506 is communicatively coupled to an electronics and processing system 508. The example wireline tool 510 includes an elongated body that may include components such as shown in FIGS. 1A and 1C. Additional components may also be included in the wireline tool 310.

Though FIGS. 7 and 8 illustrate example while-drilling and wireline systems of conveyance, respectively, other systems of conveyance can be used. Examples of other systems of conveyance that can be used with certain aspects described in the foregoing disclosure include coiled tubing, drill-pipe, and slickline systems.

Certain aspects or components of the invention can comprise a computer program that embodies the functions described herein and illustrated in the flow charts. The computer (not shown) may be disposed at the surface, e.g., in logging and control unit 226 in FIG. 7 or electronics and processing system 508 in FIG. 8. However, it should be apparent that there could be many different ways of implementing the invention in computer or algorithmic programming, and the invention should not be construed as limited to any one set of program instructions. Further, a skilled programmer would be able to write such a program to implement an embodiment of the disclosed invention based on the flow charts and associated description in the application text. Therefore, disclosure of a particular set of program code instructions is not considered necessary for an adequate understanding of how to make and use the invention.

FIG. 9 depicts an example computing system 400 in accordance with some embodiments. The computing system 400 can be an individual computer system 401A or an arrangement of distributed computer systems. The computer system 401A may include one or more analysis modules 402 that are configured to perform various tasks according to some embodiments, such as the tasks depicted in FIGS. 4 and 5. To perform these various tasks, analysis module 402 may execute independently, or in coordination with, one or more processors 404, which may be connected to one or more storage media 406. The processor(s) 404 may also be connected to a network interface 408 to allow the computer system 401A to communicate over a data network 410 with one or more additional computer systems and/or computing systems, such as 401B, 401C, and/or 401D. Note that computer systems 401B, 401C and/or 401D may or may not share the same architecture as computer system 401A, and may be located in different physical locations, e.g. computer systems 401A and 401B may be at a wellsite (FIGS. 7 and 8), while in communication with one or more computer systems such as 401C and/or 401D that are located in one or more data centers, and/or located in varying countries on different continents.

A processor can include a microprocessor, microcontroller, processor module or subsystem, programmable integrated circuit, programmable gate array, or another control or computing device.

The storage media 406 may be implemented as one or more computer-readable or machine-readable storage media. Note that while in the example embodiment of FIG. 9 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 400 is only one example of a computing system, and that computing system 400 may have more or fewer components than shown, may combine additional components not depicted in the example embodiment of FIG. 9, and/or computing system 400 may have a different configuration or arrangement of the components depicted in FIG. 9. The various components shown in FIG. 9 may be implemented in hardware, software, or a combination of hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Although specific embodiments of the invention have been described above in detail, the description is merely for purposes of illustration. Various modifications of, and equivalent acts corresponding to, the disclosed aspects of the disclosed example embodiments, in addition to those described above, can be made by those skilled in the art without departing from the scope of the invention defined in the following claims, the scope of which is to be accorded the broadest interpretation so as to encompass such modifications and equivalent structures.

What is claimed is:

1. A method, comprising
lowering a pulsed neutron tool into a borehole penetrating a formation;
irradiating the formation with neutrons;
measuring neutron induced gamma ray spectra with at least two gamma ray detectors comprising different sensitivities to borehole and formation gamma rays, wherein a first detector of the at least two gamma ray detectors is configured to measure a borehole signal and a second detector of the at least two gamma ray detectors is configured to measure a formation signal, wherein the first detector comprises back-shielding facing the formation and the second detector comprises back-shielding facing the borehole;
in a computer, generating a cross-plot forming a quadrilateral of at least one of:
ratios of spectroscopically determined yields of hydrogen (H) and chlorine (Cl) obtained from a database; and
near detector apparent salinity and far detector apparent salinity values determined from the ratios and obtained from the database, wherein said quadrilateral has four endpoints corresponding to: (1) low borehole salinity and low formation salinity, (2) low borehole salinity and high formation salinity, (3) high borehole salinity and low formation salinity, and (4) high borehole salinity and high formation salinity;
in the computer, deriving formation fluid apparent salinities from measurements obtained from the two gamma ray detectors in the pulsed neutron tool and positions of such measurements on the quadrilateral cross plot;
measuring water saturation of the formation in which the pulsed neutron tool is disposed; and
in the computer, computing formation water salinity from the formation fluid apparent salinity and water saturation.

2. The method of claim 1, wherein the pulsed neutron tool is conveyed by a while-drilling conveyance, and the while-drilling conveyance obtains a borehole signal and a formation signal by rotating a drill collar containing the pulsed neutron tool.

3. The method of claim 1, wherein the database is constructed using varying values of water saturation, hydrogen index of the formation fluid, borehole fluid salt type, or borehole fluid hydrogen index.

4. The method of claim 1, further comprising determining formation water density; and computing a density porosity that accounts for the formation water salinity.

5. The method of claim 4, wherein the computed density porosity is derived from a bulk density measurement performed with a gamma-gamma density sonde.

6. The method of claim 4, wherein the computed density porosity is derived from a bulk density measurement performed with a borehole gravity sonde.

7. The method of claim 1, further comprising determining formation water density, inputting the formation water density into a 3-dimensional reservoir model, and varying the 3-dimensional reservoir model to represent different times, thereby reflecting fluid movement and changing water salinity.

8. The method of claim 1, further comprising computing borehole salinity from the apparent borehole fluid salinity and an oil holdup.

9. A method for determining formation water salinity, comprising:
in a computer, generating a cross-plot forming a quadrilateral of at least one of ratios of spectroscopically determined yields of hydrogen (H) and chlorine (Cl) obtained from a database, and near detector apparent salinity and far detector apparent salinity values determined from the ratios and obtained from the database, wherein said quadrilateral has four endpoints corresponding to: (1) low borehole salinity and low formation salinity, (2) low borehole salinity and high formation salinity, (3) high borehole salinity and low formation salinity, and (4) high borehole salinity and high formation salinity;
lowering a pulsed neutron tool in a borehole penetrating a formation;
irradiating the formation with neutrons;
measuring neutron induced gamma ray spectra with at least two gamma ray detectors located in the pulsed neutron tool, wherein a first detector of the at least two gamma ray detectors is configured to measure a borehole signal and a second detector of the at least two gamma ray detectors is configured to measure a formation signal, wherein the first detector comprises back-shielding facing the formation and the second detector comprises back-shielding facing the borehole; and in the computer, deriving formation water salinities based on position of pulsed neutron measurements within the quadrilateral.

10. The method of claim 9, wherein the pulsed neutron tool is a smaller diameter variant of a larger diameter pulsed neutron tool.

11. The method of claim 9, wherein the pulsed neutron tool is conveyed by a while-drilling conveyance, and the while-drilling conveyance obtains a borehole signal and a formation signal by rotating a drill collar containing the pulsed neutron tool.

12. The method of claim 9, further comprising:
determining formation water density; and
computing a density porosity that accounts for the formation water salinity.

13. The method of claim 9, wherein the database is constructed using varying values of water saturation, hydrogen index of the formation fluid, borehole fluid salt type, or borehole fluid hydrogen index.

14. The method of claim 9, wherein the database is further constructed using varying values of borehole fluid oil holdup.

15. The method of claim 9, wherein the database is represented as sets of coefficients of polynomials.

16. The method of claim 9, further comprising:
determining formation water density;
inputting the formation water density into a 3-dimensional reservoir mode; and
varying the 3-dimensional reservoir model to represent different times, reflecting fluid movement and changing water salinity.

17. The method of claim 9, wherein formation water salinity is included in a history matching phase of creating reservoir simulation input.

* * * * *